(12) United States Patent
Lin (10) Patent No.: US 7,755,714 B2
(45) Date of Patent: Jul. 13, 2010

(54) LCD APPARATUS HAVING A DISPLAY MODULE WITH PIVOT PORTION ON BACK SIDE SPACED A PREDETERMINED DISTANCE FROM BOTTOM EDGE THAT ENGAGES SUPPORTER AND ROTATES TO FIRST OR SECOND POSITION DEPENDING UPON CONTACT WITH TABLE OR WALL TYPE SURFACE

(75) Inventor: Hung-Wen Lin, Tainan County (TW)

(73) Assignee: Chi Mei Optoelectronics Corp., Tainan (TW)

( * ) Notice: Subject to any disclaimer, the term of this patent is extended or adjusted under 35 U.S.C. 154(b) by 335 days.

(21) Appl. No.: 11/624,827

(22) Filed: Jan. 19, 2007

(65) Prior Publication Data

US 2007/0171321 A1    Jul. 26, 2007

(30) Foreign Application Priority Data

Jan. 25, 2006    (TW) .............................. 95102951 A (51) Int. Cl.
G02F 1/1333    (2006.01)
(52) U.S. Cl. ........................................................ 349/58
(58) Field of Classification Search ................... 349/58
See application file for complete search history.

(56) References Cited

U.S. PATENT DOCUMENTS 6,717,804 B1 *   4/2004  Skinner .................. 361/679.55
2002/0167789 A1 * 11/2002  Novin et al. ................. 361/681

FOREIGN PATENT DOCUMENTS

TW          556930          10/2003
TW          M275428          9/2005

* cited by examiner

*Primary Examiner*—John Heyman
(74) *Attorney, Agent, or Firm*—Chun-Ming Shih (57) ABSTRACT

A liquid crystal display apparatus, which is in contact with a surface, includes a liquid crystal display module and a supporter. The liquid crystal display module has a display side and a back side, which is disposed opposite to the display side. The liquid crystal display module further has a first pivoting portion. The supporter is installed on the back side, and is in contact with the surface. The supporter has a second pivoting portion pivoting on the first pivoting portion of the liquid crystal display module. The liquid crystal display module rotates about an axis, and moves between a first position and a second position with respect to the supporter. A distance exists between the liquid crystal display module and the surface.

18 Claims, 8 Drawing Sheets

LCD APPARATUS HAVING A DISPLAY MODULE WITH PIVOT PORTION ON BACK SIDE SPACED A PREDETERMINED DISTANCE FROM BOTTOM EDGE THAT ENGAGES SUPPORTER AND ROTATES TO FIRST OR SECOND POSITION DEPENDING UPON CONTACT WITH TABLE OR WALL TYPE SURFACE

BACKGROUND OF THE INVENTION

1. Field of Invention

The invention relates to a flat panel display and, in particular, to a liquid crystal display apparatus.

2. Related Art

Due to its advantages of light weight, compact size, low power consumption, and low electromagnetic radiation, the liquid crystal display (LCD) has gradually replaced the conventional cathode ray tube (CRT) display.

Figure 1:
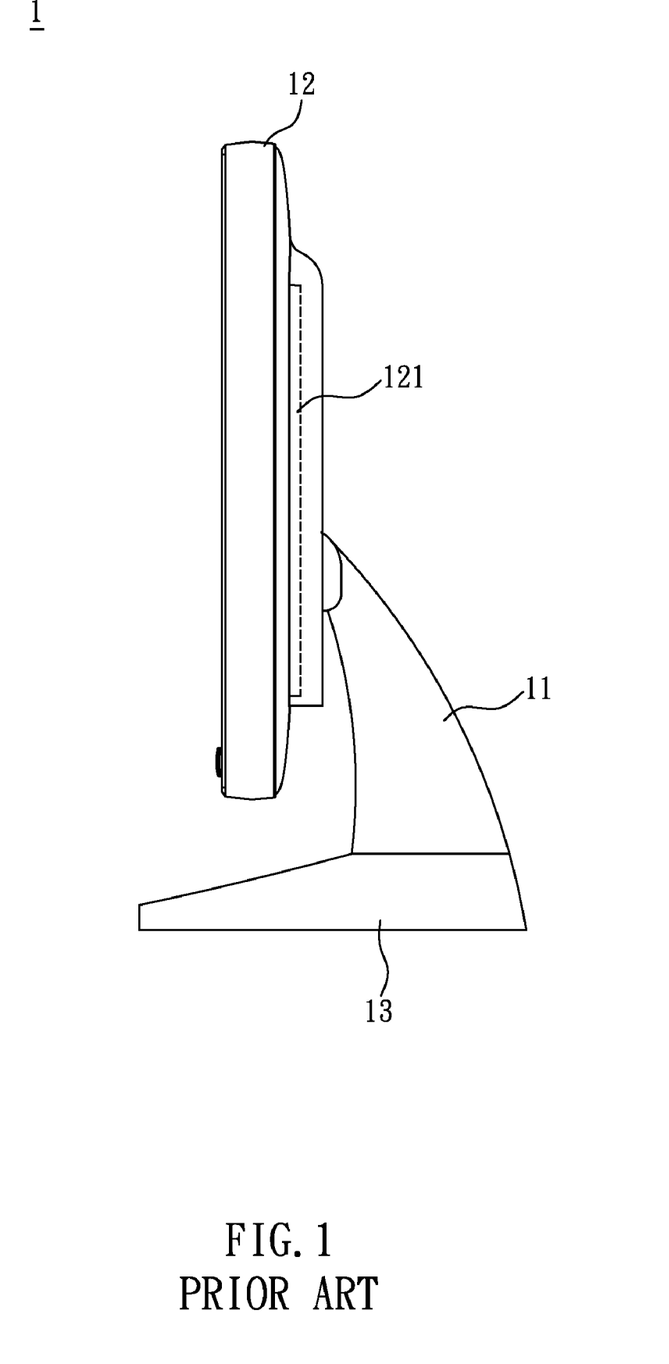
FIG. 1 is a schematic view of the conventional LCD.

As shown in FIG. 1, the conventional LCD 1 contains a supporting element 11, an LCD module 12 and a supporter 13. One end of the supporting element 11 is connected to the display module 12, and the other end if connected to the supporter 13. The LCD module 12 contains at least one light-emitting unit (not shown), such as a cold cathode fluorescent lamp and a system circuit board 121. The system circuit board 121 is electrically coupled to the light-emitting unit, and generates a driving signal to drive the light-emitting unit.

However, the conventional LCD 1 can only be disposed on a desk surface. This cannot satisfy the user's need if he or she wants to install the LCD 1 on a wall.

Of course, the user can dissemble the supporting element 11 and the supporter 13. The user has to purchase an additional wall hanger for the LCD 1. Although this enables the user to install the LCD 1 on a wall, the procedure of dissembling the supporting element is complicated and may damage the LCD. Once the user wants to put the LCD 1 on a desk again, the user has to take it off the wall hanger and re-install the supporting element 11 and the supporter 13. This is tedious.

Furthermore, there is serious competition among display manufacturers. In addition to using more efficient LCDs to attract consumers, reducing their prices is also a key factor in success.

Therefore, it is highly desirable to provide an LCD apparatus without a complicated disassembly processes so that it can be placed on a desk or installed on a wall at a lower cost.

SUMMARY OF THE INVENTION

In view of the foregoing, the invention is to provide an LCD apparatus suitable for desktop and wall-mounting purposes.

To achieve the above, the invention discloses an LCD apparatus, which is in contact with a surface. The LCD apparatus contains an LCD module and a supporter. According to the invention, the LCD module has a display side and a back side opposite to the display side. The LCD module further has a first pivoting portion. The supporter is disposed on the back side and in contact with the surface. The supporter has a second pivoting portion pivoting on the first pivoting portion of the liquid crystal display module. The liquid crystal display module rotates about an axis, and moves between a first position and a second position with respect to the supporter. A distance exists between the liquid crystal display module and the surface.

To achieve the above, the invention also discloses an LCD apparatus, which is in contact with a surface. The LCD apparatus contains an LCD module and a supporter. According to the invention, the LCD module has a display side and a back side opposite to the display side. The LCD module further has a first pivoting portion. The supporter is disposed on the back side and in contact with the surface. The supporter has a second pivoting portion pivoting on the first pivoting portion of the liquid crystal display module. The liquid crystal display module rotates about an axis, and moves between a first position and a second position with respect to the supporter. The distance between the axis and the bottom of the liquid crystal display module is shorter than the distance between the axis and the bottom of the supporter.

In summary, the LCD module in the disclosed LCD apparatus is pivotally installed via the first pivoting portion onto the second pivoting portion of the supporter. The supporter supports the LCD module. Therefore, there is no need for an additional supporting element. In other words, the cost of the supporting element in the prior art can be saved. In addition, using the pivoting connection between the LCD module and the supporter allows the LCD module to rotate with respect to the supporter. Therefore, the LCD apparatus can be disposed on either a desktop or a wall.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 2:
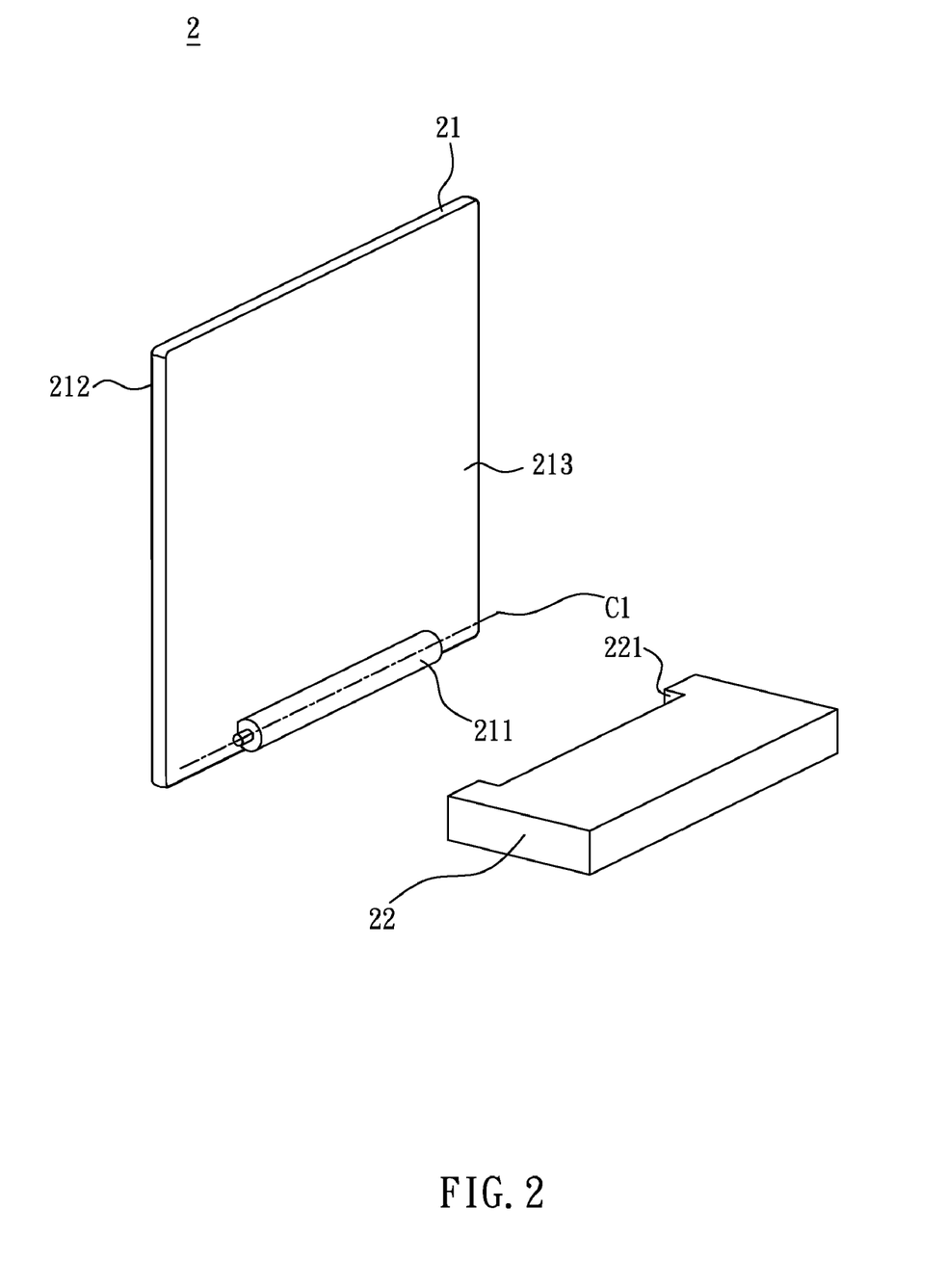
FIG. 2 is a three-dimensional schematic view of one part of the disclosed LCD apparatus according to the preferred embodiment.
Figure 3:
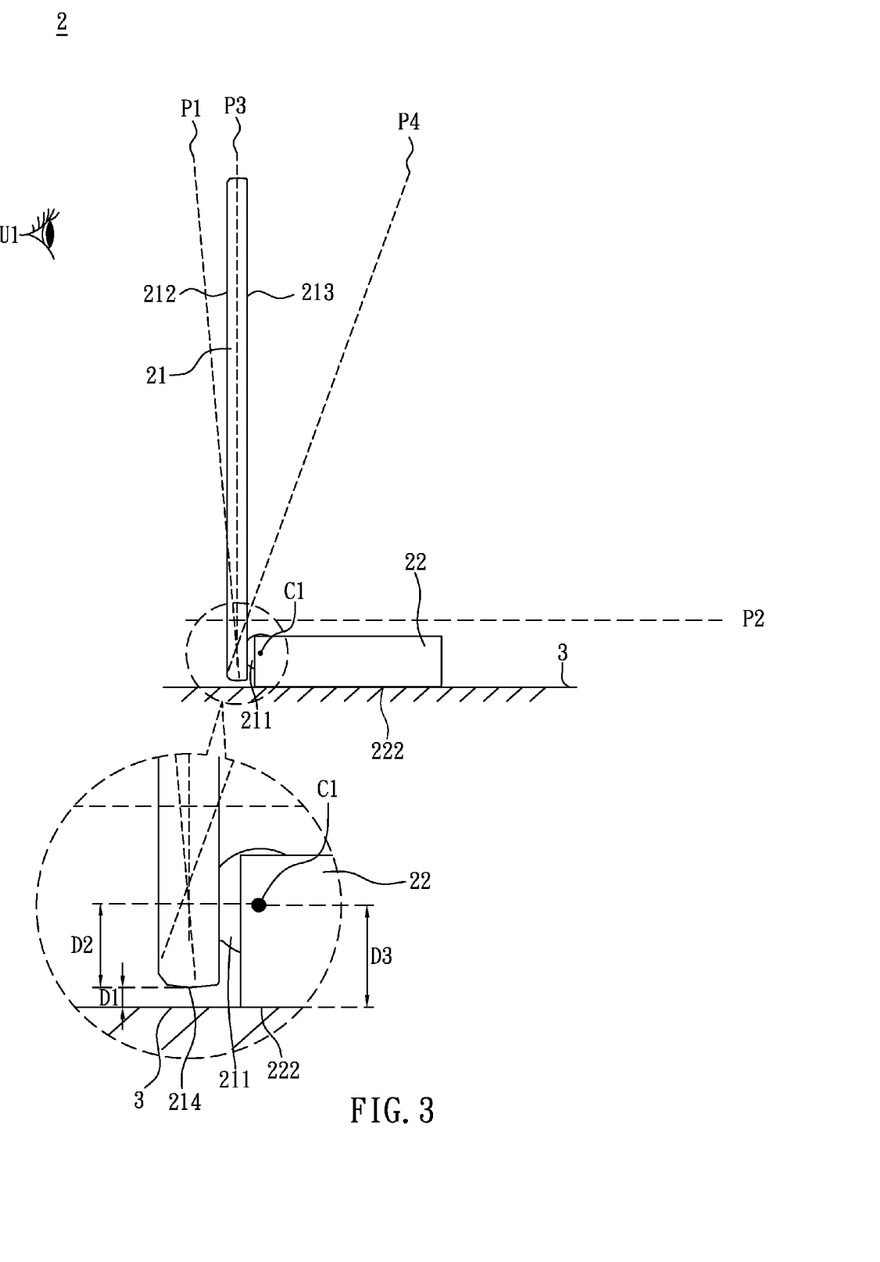
FIG. 3 is a side view of the disclosed LCD apparatus used on a desktop.

Please refer simultaneously to FIGS. 2 and 3. The disclosed LCD apparatus 2 according to a preferred embodiment is in contact with a surface 3. The LCD apparatus 2 contains an LCD module 21 and a supporter 22.

The LCD module 21 has a first pivoting portion 211, a display side 212, and a back side 213 opposite to the display side 212. The LCD module 21 further has a bottom portion 214 disposed in the vicinity of the display side 212 and the back side 213. In this embodiment, the first pivoting portion 211 is disposed on the back side 213 of the LCD module 21. The first pivoting portion 211 is designed to be a long shaft. Of course, according to different design needs, the first pivoting portion 211 can be installed at different positions of the LCD module 21.

The supporter 22 is disposed on the back side of the LCD module 21 and in contact with the surface 3. Additionally, the supporter 22 has a second pivoting portion 221 connected to the first pivoting portion 211 of the LCD display 21, so that the LCD module 21 rotates about an axis C1 between a first position P1 and a second position P2 with respect to the supporter 22. Moreover, a distance D1 exists between the LCD module 21 and the surface 3. In this embodiment, the second pivoting portion 221 is designed to be a long concave stripe opposite to the first pivoting portion 211. Thus, the second pivoting portion 221 can cover both ends of the first pivoting portion 211 so as to prevent the two ends from exposures and possible damages. Of course, the shapes of the first pivoting portion 211 and the second pivoting portion 221 can be designed according to practical needs. Such variations are allowed and considered as part of the invention.

In this embodiment, the supporter 22 further includes a contact surface 222 in contact with the surface 3. The contact surface 222 is the bottom part of the supporter 22. The distance D2 between the bottom portion 214 of the LCD module 21 and the axis C1 is shorter than the distance D3 between the axis C1 and the bottom part (contact surface 222) of the supporter 22. As shown in FIG. 3, to satisfy different habits and needs of the user U1 when using the LCD apparatus 2, the angle between the first position P1 and the second position P2 can be designed according to practical needs. In this embodiment, the angle between the first position P1 and the second position P2 is smaller than or equal to 95 degrees. Generally speaking, most users are used to adjusting the front angle (the angle between the first position P1 and a third position P3) of the LCD module 21 within 5 degrees, or to adjusting the rear angle (the angle between the third position P3 and a fourth position P4) of the LCD module 21 within 20 degrees. Therefore, the distance D1 between the LCD module 21 and the surface 3 provides a space for the LCD module 21 to have its front and rear angles adjusted.

Figure 4:
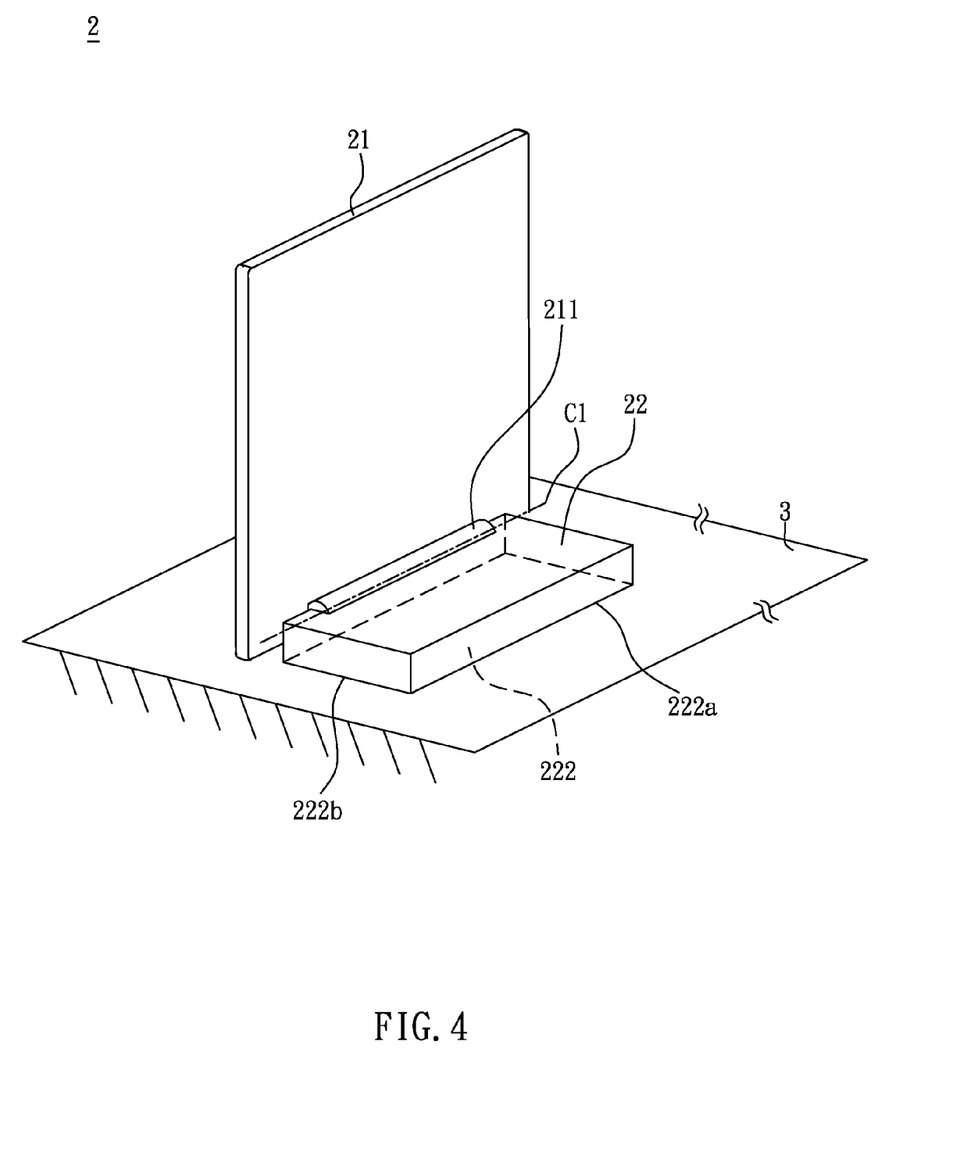
FIG. 4 is a three-dimensional view of the LCD apparatus in FIG. 3.

As illustrated in FIG. 4, the contact surface 222 of the supporter 22 has a first edge 222a roughly parallel to the axis C1 and a second edge 222b with an angle from the first edge 222a. The length of the first edge 222a is greater than that of the second edge 222b. In this embodiment, the shape of the supporter 22 is rectangular. Correspondingly, the shape of the contact surface 222 is also rectangular. The longer side of the contact surface 222 is the first edge 222a, and the shorter side thereof is the second edge 222b.

Figure 5:
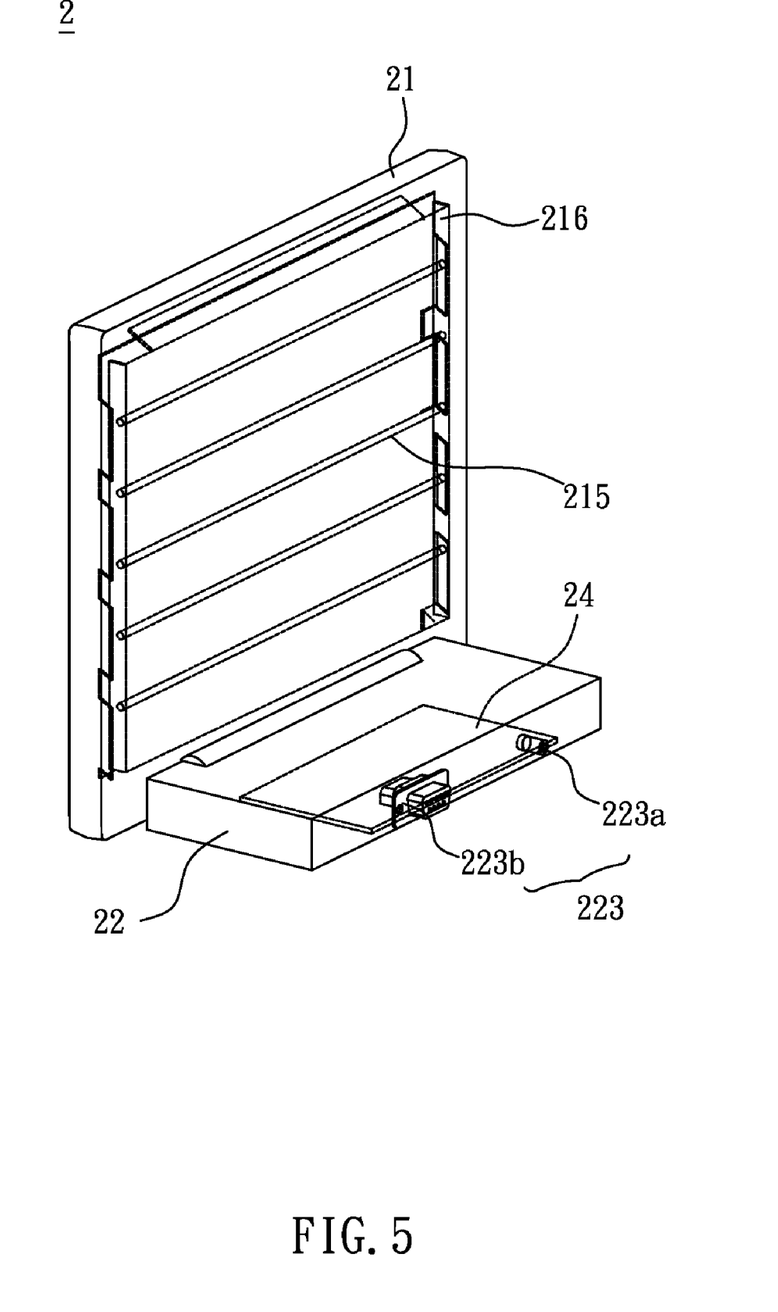
FIG. 5 shows the interior structure of the disclosed LCD apparatus.

As shown in FIG. 5, the LCD apparatus 2 also contains a system circuit board 24 disposed inside the supporter 22 and in electrical contact with the LCD module 21. In comparison with the prior art, the volume occupied by the system circuit board in the LCD module is smaller, reducing the thickness of the LCD module. In accord with the system circuit board 24, the supporter 22 further includes at least one input terminal 223 electrically coupled with the system circuit board 24.

Figure 6:
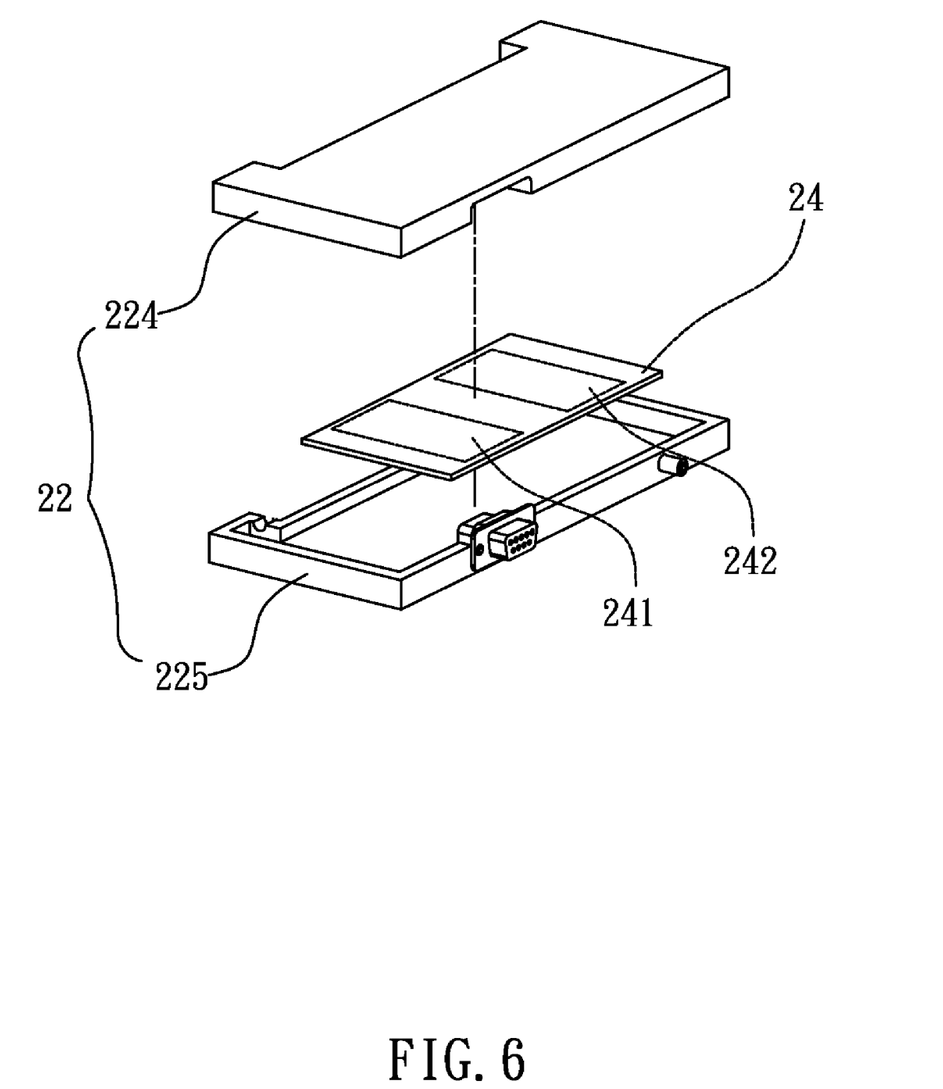
FIG. 6 is an exploded view of the supporter in the LCD apparatus of FIG. 5.

With simultaneous reference to FIGS. 5 and 6, the system circuit board 24 includes a power circuit 241 and an analog-to-digital (A/D) circuit 242. The LCD module 21 includes at least one light-emitting unit 215 and a liquid crystal panel 216. The power circuit 241 inside the system circuit board 24 is electrically coupled with the light-emitting unit 215. A power supply provides power via the input terminal 223a to the power circuit 241 in the system circuit board 24, so that the system circuit board 24 generates a driving signal to drive the light-emitting unit 215. In general, the light-emitting unit 215 contains at least one cold cathode fluorescent lamp (CCFL) or at least one light-emitting diode (LED). Besides, the A/D circuit 242 in the system circuit board 24 is electrically coupled to the liquid crystal panel 216 and receives at least one image signal via an input terminal 223b. The image signal is then converted from an analog signal to a digital signal, and is output to an LCD panel 216 and displayed on the display side 212.

As shown in FIG. 6, the supporter 22 also has a top cover 224 and a bottom cover 225 opposite to the top cover 224. The system circuit board 24 is disposed between the top cover 224 and the lower cover 225. In this embodiment, the top cover 224 and the lower cover 225 are combined by hooking, locking, or gluing for convenience of production or maintenance.

The LCD module 21 can rotate with respect to the supporter 22. When the LCD module 21 is adjusted to the second position P2, as in FIG. 3, the LCD apparatus 2 can be easily packed, carried, or mounted on a wall.

Figure 7:
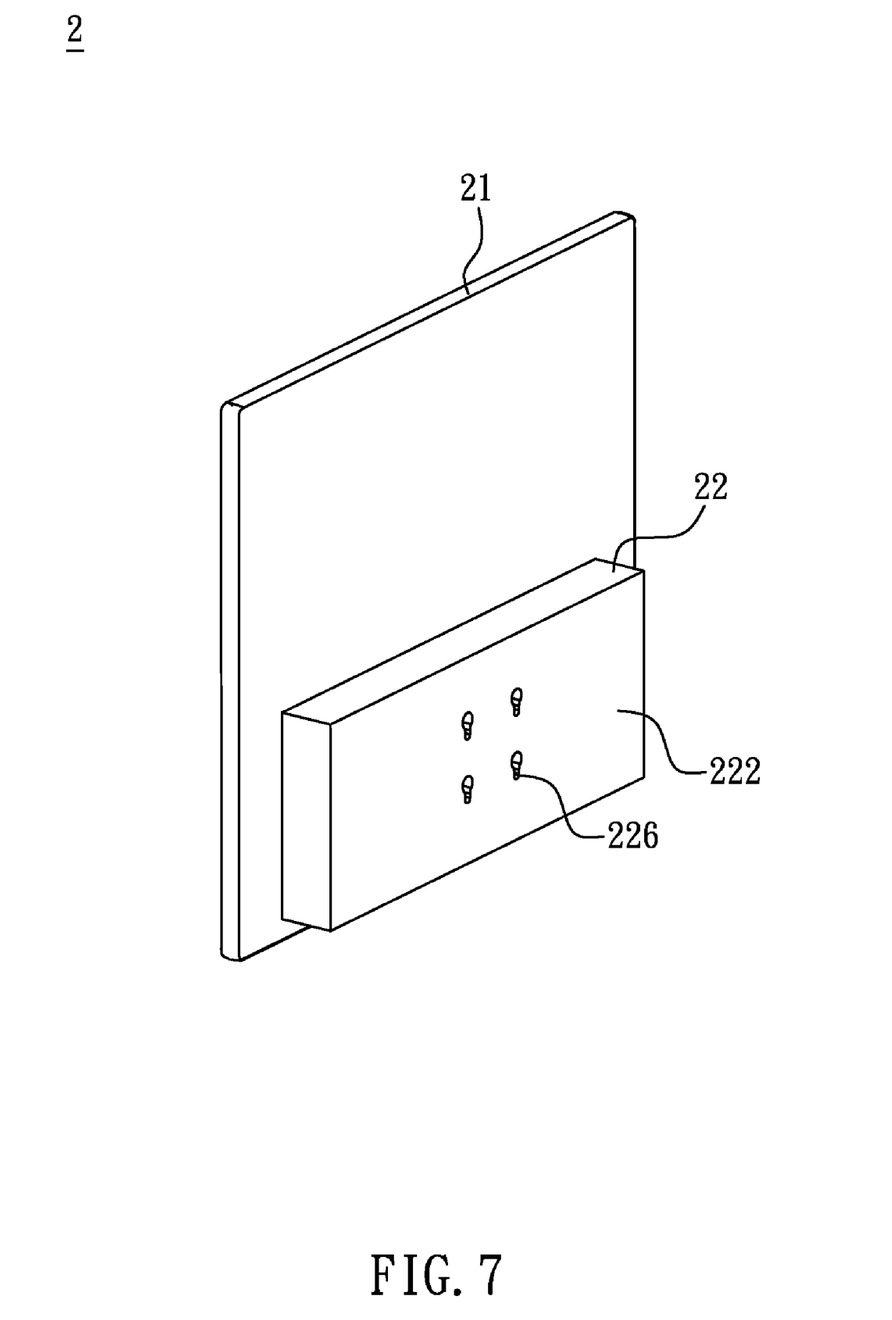
FIG. 7 is another three-dimensional view of the LCD apparatus in FIG. 3.
Figure 8:
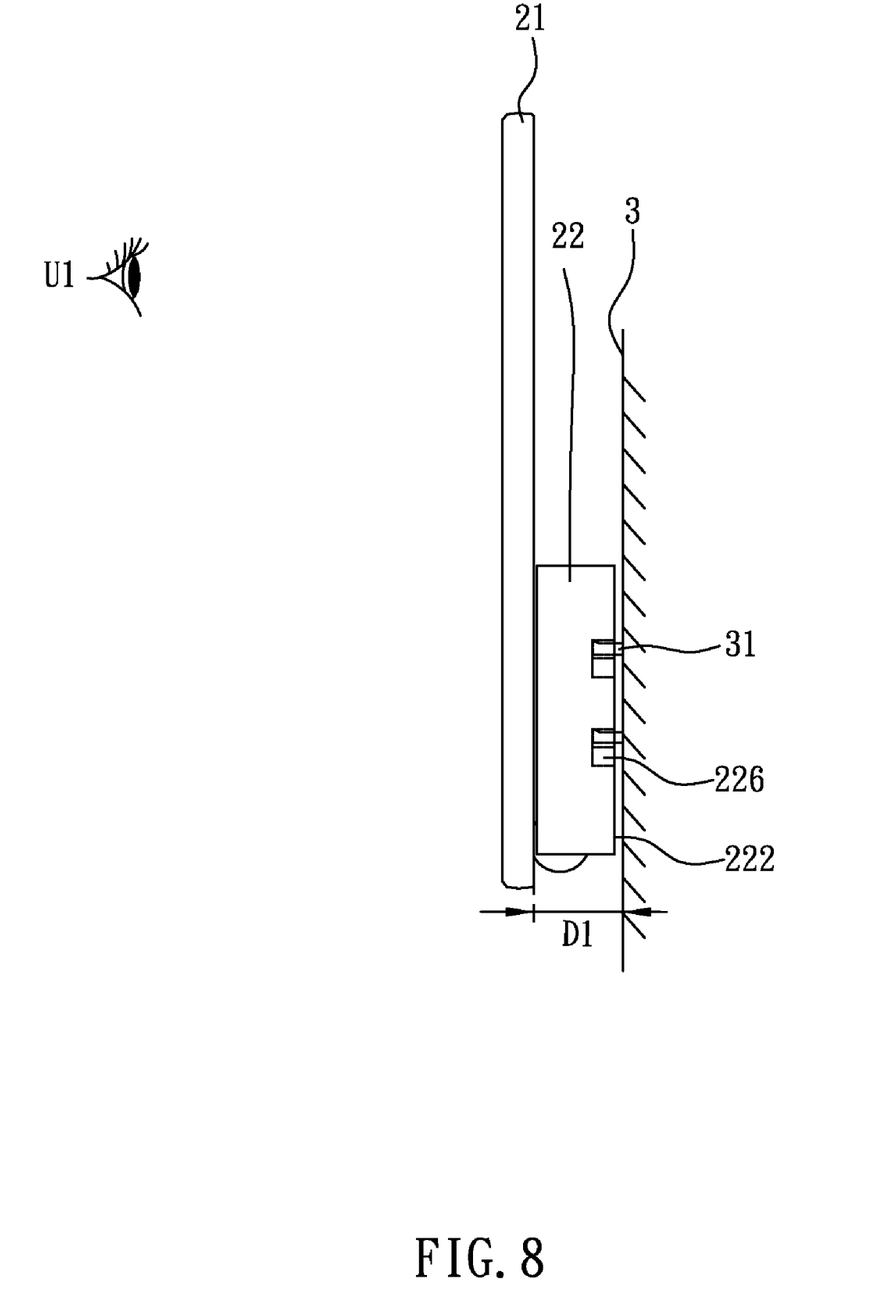
FIG. 8 is a side view of the disclosed LCD apparatus used on a wall.

As shown in FIG. 7, the contact surface 222 of the supporter 22 is formed with at least one opening 226. In this embodiment, the contact surface 222 is formed with four openings 226. Please also refer to FIG. 8. The surface 3 is a wall surface. At least one connecting element 31 is installed on the surface 3 in accord with the openings 226. When the connecting element 31 is connected with the openings 226 of the supporter 22, the LCD apparatus 2 can be readily mounted on the wall, saving desktop space.

In summary, the LCD module in the disclosed LCD apparatus is pivotally installed via the first pivoting portion onto the second pivoting portion of the supporter. The supporter supports the LCD module. Therefore, there is no need for an additional supporting element. In other words, the cost of the supporting element in the prior art can be saved. In addition, using the pivoting connection between the LCD module and the supporter allows the LCD module to rotate with respect to the supporter. Therefore, the LCD apparatus can be disposed on either a desktop or a wall. Moreover, disposing the system circuit board inside the supporter can reduce the thickness of the LCD module. All the above-mentioned advantages can greatly enhance the competitiveness of the disclosed product and attract more consumers.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A liquid crystal display (LCD) apparatus comprising:
   an LCD module, which has a display side, a back side opposite to the display side, and a first pivoting portion disposed on the back side and spaced a predetermined distance from the bottom edge of the back side; and
   a supporter having a second pivoting portion disposed on the back side and pivotally installed on the first pivoting portion of the LCD module, wherein the LCD module rotates about an axis between a first position and a second position with respect to the supporter being in contact with a table type surface and a wall type surface, respectively, and a predetermined distance exists between the LCD module and the table or wall type surface.

2. The LCD apparatus of claim 1, wherein the first pivoting portion is a shaft.

3. The LCD apparatus of claim 2, wherein the shaft is a long shaft.

4. The LCD apparatus of claim 1, wherein the first position is spaced from the supporter, the second position is adjacent to the supporter, the angle between the first position and the second position is smaller than or equal to 95 degrees, a third position and a fourth position of the LCD module are between the first position and the second position, an angle between the first position and the third position within 5 degrees, and an angle between the third position and the fourth position within 20 degrees.

5. The LCD apparatus of claim 1, wherein the supporter further comprises a contact surface in contact with the table or wall type surface, the contact surface has a first edge roughly parallel to the axis and a second edge at an angle relative to the first edge, and the length of the first edge is greater than the length of the second edge.

6. The LCD apparatus of claim 1 further comprising:
a system circuit board disposed inside the supporter and electrically coupled with the LCD module.

7. The LCD apparatus of claim 6, wherein the LCD module further comprises a light-emitting unit, and the system circuit board is electrically coupled with the light-emitting unit and generates a driving signal to drive the light-emitting unit.

8. The LCD apparatus of claim 6, wherein the supporter further comprises an input terminal in electrical connection with the system circuit board.

9. The LCD apparatus of claim 1, wherein the supporter further comprises a contact surface in contact with the table or wall type surface, and the contact surface has at least one opening.

10. A liquid crystal display (LCD) apparatus comprising:
an LCD module, which has a display side, a back side opposite to the display side, and a first pivoting portion disposed on the back side and spaced a predetermined distance from the bottom edge of the back side; and
a supporter having a second pivoting portion disposed on the back side and pivotally installed on the first pivoting portion of the LCD module, wherein the LCD module rotates about an axis between a first position and a second position with respect to the supporter being in contact with a table type surface and a wall type surface, respectively, and a first distance between the axis and the bottom of the LCD module is shorter than a second distance between the axis and the bottom of the supporter.

11. The LCD apparatus of claim 10, wherein the first pivoting portion is a shaft.

12. The LCD apparatus of claim 11, wherein the shaft is a long shaft.

13. The LCD apparatus of claim 10, wherein the first position is spaced from the supporter, the second position is adjacent to the supporter, the angle between the first position and the second position is smaller than or equal to 95 degrees, a third position and a fourth position of the LCD module are between the first position and the second position, an angle between the first position and the third position within 5 degrees, and an angle between the third position and the fourth position within 20 degrees.

14. The LCD apparatus of claim 10, wherein the supporter further comprises a contact surface in contact with the table or wall type surface, the contact surface has a first edge roughly parallel to the axis and a second edge at an angle relative to the first edge, and the length of the first edge is greater than the length of the second edge.

15. The LCD apparatus of claim 10 further comprising:
a system circuit board disposed inside the supporter and electrically coupled with the LCD module.

16. The LCD apparatus of claim 15, wherein the LCD module further comprises a light-emitting unit, and the system circuit board is electrically coupled with the light-emitting unit and generates a driving signal to drive the light-emitting unit.

17. The LCD apparatus of claim 15, wherein the supporter further comprises an input terminal in electrical connection with the system circuit board.

18. The LCD apparatus of claim 10, wherein the supporter further comprises a contact surface in contact with the table or wall type surface, and the contact surface has at least one opening.

* * * * *